United States Patent [19]
Depenbrock

[11] 3,906,337
[45] Sept. 16, 1975

[54] ARRANGEMENT FOR FEEDING A DC LOAD CIRCUIT FROM SINGLE PHASE OR POLYPHASE AC VOLTAGE MAINS WITH ECONOMIZING OF IDLE POWER CONSUMPTION OF LOAD ALTERNATING CURRENT

[75] Inventor: Manfred Depenbrock, Bochum-Stiepel, Germany

[73] Assignee: Brown, Boveri & Cie, AG, Germany

[22] Filed: Mar. 13, 1974

[21] Appl. No.: 450,795

[30] Foreign Application Priority Data
Apr. 5, 1973  Germany............................ 2317068
Apr. 5, 1973  Germany............................ 2317067

[52] U.S. Cl. ....................... 321/10; 321/19; 321/47; 323/8; 323/20; 323/24; 323/119; 321/9 A
[51] Int. Cl.² ....................... H02M 7/17; G05F 1/68
[58] Field of Search ........... 321/10, 14, 18, 47, 9 A; 323/22 SC, 20, 119, 123–128, 8, 24

[56] References Cited
UNITED STATES PATENTS

| | | | |
|---|---|---|---|
| 3,471,768 | 10/1969 | Doyle et al. ........................ | 321/47 |
| 3,535,611 | 10/1970 | Toulemonde ..................... | 321/18 X |
| 3,767,998 | 10/1973 | Beling................................ | 321/18 |
| 3,798,531 | 3/1974 | Allington .......................... | 321/18 |
| 3,825,815 | 7/1974 | Gyugyi et al...................... | 321/10 |
| 3,831,077 | 8/1974 | Richeson, Jr. .................... | 321/18 X |

*Primary Examiner*—Gerald Goldberg
*Attorney, Agent, or Firm*—McGlew and Tuttle

[57] ABSTRACT

The arrangement includes a mains transformer having a primary winding and a secondary winding, with the secondary winding being connected to a load circuit including a full wave rectifier, smoothing devices, and at least one positively quenchable, or positive cut-off, controlled semi-conductor rectifier associated with a respective control device. The smoothing devices consist of at least one condenser, at least one choke and at least one filter tuned to double the frequency of the AC voltage mains. The magnitude of the alternating or direct current, available on the secondary side of the mains transformer in the form of current or voltage, is controlled by one or more positively quenchable controlled semi-conductor rectifiers, and the control device controls the controlled rectifier or rectifiers by pulse width modulation thereof to maintain the time slope of the power in the load circuit substantially in phase with the slope of the power, fluctuating with twice the mains frequency about the constant-per-unit-of-time mean load power, of the load alternating current which is in phase with the mains AC voltage. In one embodiment, the current flowing from the AC voltage mains through a full wave rectifier into the DC load circuit is maintained constant and an AC voltage, of twice the mains frequency, is superposed on the DC voltage. In another embodiment, the DC voltage of the DC load is maintained constant and alternating current of twice the mains frequency is superposed on the direct current.

26 Claims, 24 Drawing Figures

ARRANGEMENT FOR FEEDING A DC LOAD CIRCUIT FROM SINGLE PHASE OR POLYPHASE AC VOLTAGE MAINS WITH ECONOMIZING OF IDLE POWER CONSUMPTION OF LOAD ALTERNATING CURRENT

FIELD AND BACKGROUND OF THE INVENTION

This invention is directed to an arrangement for feeding a DC load circuit from single phase or polyphase AC voltage mains with economizing in the idle, or reactive or wattless, power consumption of the load alternating current, and more particularly, to such an arrangement including a mains transformer whose secondary side is connected to a full wave rectifier, smoothing devices, and at least one positively quenchable, or positive cut-off, controlled semiconductor rectifier with an associated control device.

For supplying a DC load circuit from AC voltage mains, there are frequently used controlled rectifiers with mains commutation, and whose smoothing devices, such as condensers, chokes, or filters, are post-connected, or connected on the output side of the controlled rectifiers. These known rectifiers have the disadvantage, however, that they take, from the feeding or supplying AC voltage mains, not only the required active power but also the fundamental and harmonic idle power, such as the shift idle power or reactive or wattless kva. This leads to an increased load on the feeding AC voltage mains, and this can be disadvantageous, particularly in low power, single phase systems. Additional trouble may be caused in the signalling plants and the remote signalling plants, by the harmonics of the load alternating current taken from the AC voltage mains.

In order to compensate the phase shift of the load alternating current, it is known to arrange phase shifters ahead of, or on the input side of, the controlled rectifiers, and to provide additional compensation from capacitances, inductances and resistances in order to improve the curve form of the load alternating current. Although the additional load on the feeding voltage mains, with the shift and harmonic idle or reactive power or wattless kva, can be reduced by this measure, the power factor of the mains cos $\phi$ is little improved by this measure. The objective of the invention is to provide an arrangement of the above mentioned type which permits feeding a DC load circuit from AC voltage mains with substantially harmonic-free load alternating current which is substantially in phase with the AC voltage of the mains.

SUMMARY OF THE INVENTION

In accordance with the invention, this problem is solved in that the smoothing devices consist of at least one condenser, at least one choke and at least one filter tuned to double the mains frequency, and that the size or magnitude of the alternating or direct current, available on the secondary side of the mains transformer in the form of current or voltage, is controlled by positively quenchable controlled semiconductor rectifiers by pulse width modulation by means of a control device. The control of the controlled rectifiers is effected in a manner such that the time slope of the power in the DC load circuit is substantially in phase with the slope of the power, fluctuating with double the mains frequency about the constant-per-unit-of-time mean load power, of the load alternating current, which latter is in phase with the AC voltage from the mains.

In an advantageous embodiment of the invention, the valves are included in at least one controlled semiconductor rectifier unit by means of which the direct or alternating current can be started or cut-off in predetermined time intervals in the load circuit connected to the secondary winding of the mains transformer.

In another also advantageous embodiment of the invention, the voltage or current pulses, of each half wave appearing in the full wave rectifier and originating from the AC voltage mains, are substantially symmetrical to each other, with all the controlled semiconductor rectifiers being conductive at the time of passage of the half wave through zero.

It is also advantageous to combine several arrangements of the present type into an overall arrangement where the transformer consists of several part transformers, and where each part transformer is associated with a respective arrangement of the overall arrangement, with the part transformers being connected in series on the primary side. In this overall arrangement, the valves of the controlled semi-conductor rectifier unit of one arrangement can be ignited or quenched phase-shifted with respect to the valves of the controlled semi-conductor rectifier unit of other arrangements.

An object of the invention is to provide an improved arrangement for feeding a DC load current from single or polyphase AC voltage mains.

Another object of the invention is to provide such an arrangement in which there is a saving or economizing in the idle or reactive or wattless, power consumption of the load alternating current.

A further object of the invention is to provide such an arrangement operable to feed a DC load circuit from AC voltage mains with a substantially harmonic-free load alternating current which is substantially in phase with the AC voltage from the mains.

For an understanding of the principles of the invention, reference is made to the following description of typical embodiments thereof as illustrated in the accompanying drawings.

DESCRIPTION OF THE PREFERRED EMBODIMENTS

When true active power is taken by a load from AC voltage mains, only fundamental active power that is, the active power furnished by the fundamental frequency of 50 or 60 Hz, is taken. In this case, the total active power consists of a portion with a value which is constant per unit of time, and on which there is superposed an active power portion pulsating at double the mains frequency and whose amplitude or magnitude is just as great as the portion having a value which is constant per unit of time. This relation results from the following equation:

$$P_w = u \cdot \sin(\omega t) \cdot i \cdot \sin(\omega t)$$
$$= \frac{u \cdot i}{2} (1 - \cos 2\omega t) = P_m (1 - \cos 2\omega t) \qquad (1)$$

In equation (1), $P_w$ designates the fundamental active power, $u$ designates the amplitude of the AC voltage from the mains, $f$ designates the amplitude of the alternating current from the mains, $P_m$ designates the mean power, and $\omega/2\pi$ designates the frequency of the AC voltage from the mains.

The basic concept of the present invention consists in adapting the time slope of the power in the DC load circuit to the slope of the pulsating AC active power.

One possibility of realizing the objectives of the invention consists in keeping the current, flowing from the AC voltages through a rectifier into the DC load circuit, constant, and superposing, in the DC voltage, an AC voltage with twice the mains frequency. In this case, the following relation applies:

$$P_g = I_g [U_g - u \cdot \cos(2\omega t)] \qquad (2)$$

In equation (2), $P_g$ designates the active power taken from the mains, $I_g$ designates the direct current flowing in the DC load, $U_g$ designates the DC voltage impressed across the DC load, u designates the amplitude of the AC voltage from the mains, and $\omega/2\pi$ designates the frequency of the AC voltage from the mains.

Alternatively, the DC voltage can be kept constant to the DC load, and an alternating current, of twice the frequency of the AC voltage from the mains, can be superposed on the load direct current. In this case, the following relations apply:

$$P_g = U_g [I_g - i \cdot \cos(2\omega t)] \qquad (3)$$

Figure 1A:
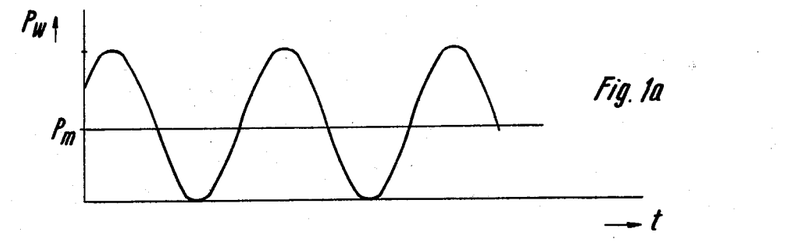
FIG. 1a is a time diagram of the power taken from AC voltage mains with a power factor cos $\phi = 1$.

The pulsating delivery of active power of the AC mains at a unity power factor, $\cos \phi = 1$, is represented in FIG. 1a. In this case, the AC power consists of a portion having a constant value $p_m$ per unit of time, on which there is superposed a power portion pulsating with twice the frequency of the AC voltage from the mains and whose amplitude is just as great as the amplitude $p_m$. Such a relation is derived from the following equation:

$$P_w = u \cdot \sin \omega t \cdot i \cdot \sin \omega t = \frac{u \cdot i}{2}(1 - \cos 2\omega t)$$
$$= P_m (1 - \cos 2\omega t)$$

In this equation, $P_w$ indicates the fundamental active power, $u$ indicates the amplitude of the Ac voltage from the mains, $i$ indicates the amplitude of the alternating current from the mains, $p_m/2\pi$ indicates the mean power, and $\omega$ indicates the frequency of the AC voltage from the mains.

The idea or concept of the present invention consists in adapting the slope of the DC load to the slope of the pulsating AC power. If the current flowing from the AC voltage mains through a full wave rectifier in the DC load circuit is kept constant, and an AC voltage of twice the mains frequency is superposed on the DC voltage, the following relation obtains:

$$P_g = I_g (U_g - u \cdot \cos 2\omega t)$$

In this equation, $P_g$ designates the active power taken from the AC voltage mains, $I_g$ the direct current flowing in the DC load circuit, $U_g$ the DC voltage impressed on the DC load, u the amplitude of the AC voltage from the mains, and $\omega/2\pi$ the mains frequency.

In accordance with another possibility, the DC voltage impressed on the DC load can be kept constant and an alternating current, of twice the mains frequency, can be superposed on the direct current. This produces the following relation:

$$P_g = U_g (I_g - i \cdot \cos 2\omega t)$$

Figure 1B:
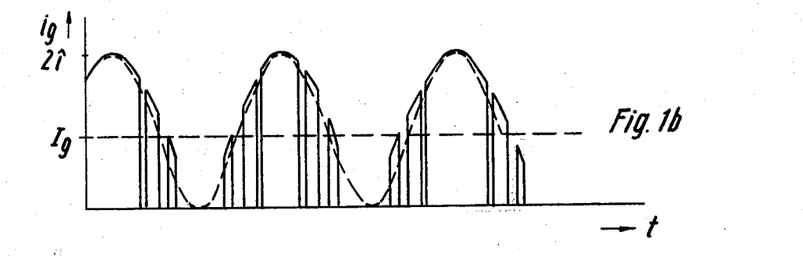
FIGS. 1b to 1e are time diagrams of current and voltage in the DC load circuit with controlled semiconductor rectifiers controlled in accordance with the invention.
Figure 1C:
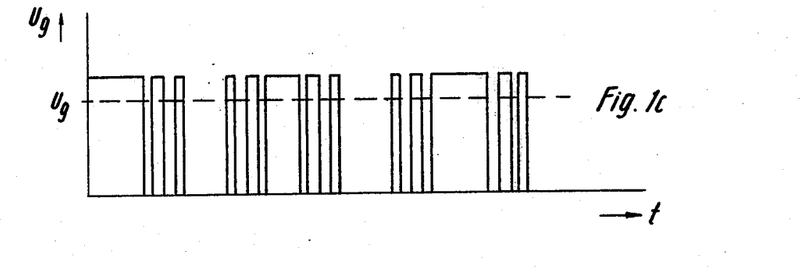
Figure 1D:
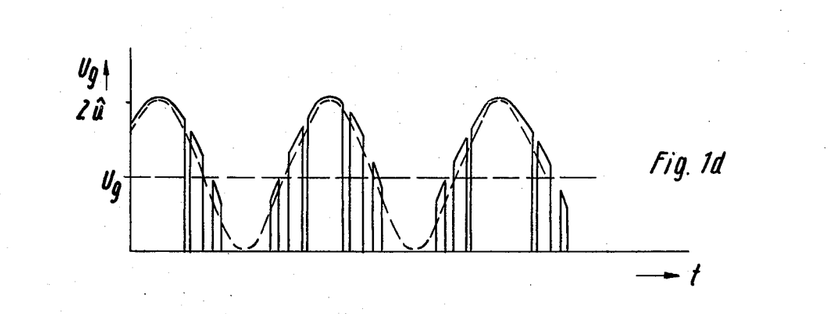
Figure 1E:
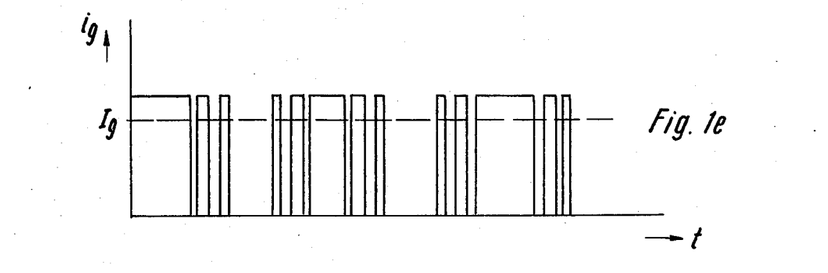

The relations expressed in equation (1) are represented in FIG. 1a, those from equation (2) in FIGS. 1b and 1c, and those of equation (3) in FIGS. 1d and 1e.

The time slopes represented in the time diagrams of FIGS. 1b and 1d are realized by cutting out the voltage or current of twice the mains frequency from the rectified alternating current or voltage half waves, by means of a controlled semiconductor rectifier unit operated in accordance with a pulse control method, and which includes one or more positively quenchable controlled semi-conductor rectifiers such as, for example, thyristors.

FIG. 1b illustrates the slope of a rectified mains current half wave as an envelope of a current pulse sequence, which appears at the output of a controlled semi-conductor rectifier unit arranged in the load circuit and operated by pulse control. The current pulse lengths and the current pulse intervals are so varied that the mean value $I_g$ of the current pulse sequence, represented by broken lines, consists of a DC portion and of a portion pulsating with twice the mains frequency.

As can be seen from a comparison with the AC power as shown in FIG. 1a, the product, formed of the slope of DC voltage and direct current, has the same time slope as the active power of the AC mains. FIG. 1c illustrates the voltage appearing at the output of the controlled semi-conductor rectifier unit, and which consists of a sequence of voltage pulses of equal amplitude and which is obtained by short-circuiting the DC voltage during the intervals between pulses.

FIG. 1d illustrates a rectified half wave of the mains voltage as an envelope of a voltage pulse sequence at the output of a semi-conductor controlled rectifier unit operated by the pulse control procedure. In analogy to the representation in FIG. 1b, the voltage pulse lengths and the voltage pulse intervals of the individual output voltage pulses of the controlled semi-conductor rectifier unit are so varied that the mean voltage value $U_g$, represented in broken lines, is likewise composed of a DC portion and of a sinusoidal portion having twice the mains frequency.

Figure 2:
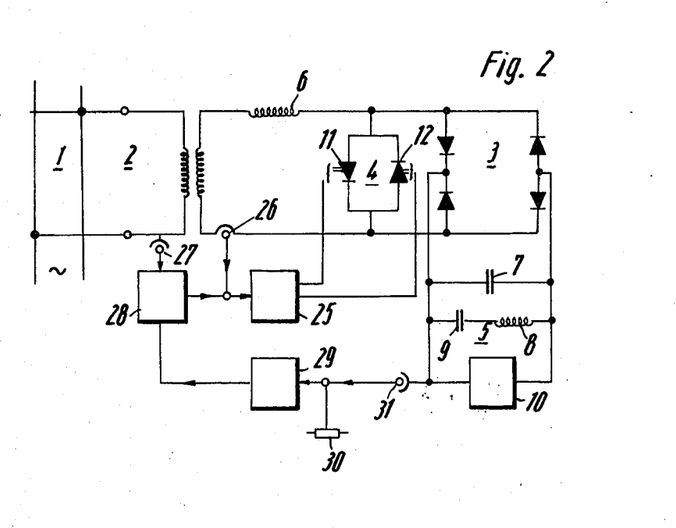
FIG. 2 is a schematic wiring diagram of a first embodiment of the invention arrangement, with measuring, control and regulating devices.

One embodiment of an arrangement in accordance with the invention is shown in FIG. 2. Referring to FIG. 2, single-phase AC voltage mains 1 feed, through a mains transformer 2 and a full wave rectifier 3, a DC load 10. In the illustrated embodiment, the full wave rectifier 3 is a diode rectifier in the Graez connection. The DC load 10 can be, for example, a DC electrical machine or an inverter. Between transformer 2 and full wave rectifier 3, there is arranged a controlled semi-conductor rectifier unit or arrangement 4, and between rectifier 3 and load 10, there is provided a filter 5 tuned to twice the mains frequency. Smoothing devices are also provided, and consist of a smoothing choke 6, arranged in series on the secondary side of transformer 2, and of a smoothing condenser 7, arranged behind and in parallel with full wave rectifier 3. Filter 5 comprises a series oscillatory circuit consisting of a choke 8 and a condenser 9. The unit or arrangement 4 consists, in the illustrated embodiment, of two positively quenchable, or positive cut-off, controlled semi-conductor rectifiers 11 and 12 connected in parallel with each other with opposite polarity, these rectifiers, in most cases, being preferably thyristors. However, the controlled rectifiers can also be arranged in the manner shown in FIGS. 4 through 11, to serve as the controlled rectifier units or arrangements 4. For each controlled rectifier, designed as a thyristor, there is provided an electrical ignition circuit and a quenching circuit. The two control connections represented in FIG. 2 with respect to the thyristors symbolize that each thyristor has both an ignition circuit and a separate quenching circuit.

The smoothing devices are provided to obtain the current and voltage pulses represented in FIGS. 1b and 1c. Smoothing condenser 7 serves, in addition, to filter the current pulses out of the impressed DC voltage, and smoothing choke 6, aside from filtering out the voltage pulses, also serves to pass the direct current to the load.

The single phase AC voltage mains shown in FIG. 2 could be replaced by polyphase, for example, three-phase voltage mains, in which case a corresponding polyphase mains transformer 2 and a corresponding polyphase full wave rectifier 3 must be provided.

FIGS. 4 through 7 illustrate additional embodiments for the positively quenchable, or positive cut-off, controlled rectifier units or arrangements, with parts corresponding to the arrangements shown in FIG. 2 having the same reference numbers.

Figure 4:
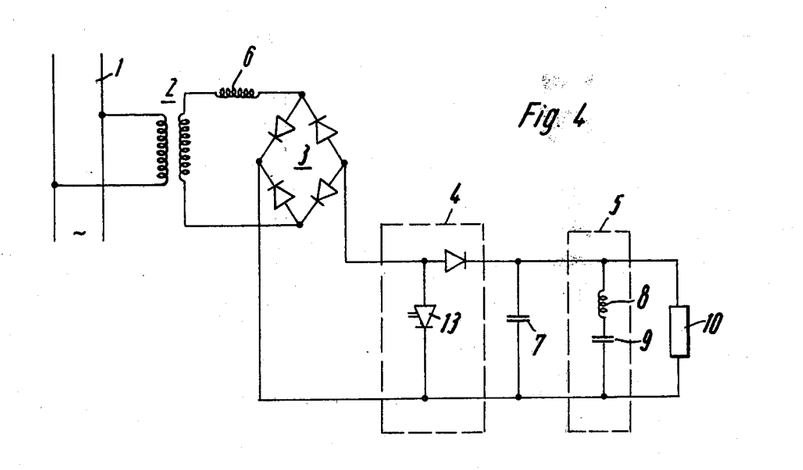
FIGS. 4 through 11 are schematic wiring diagrams illustrating additional embodiments of the arrangement in accordance with the invention, with the valves of the controlled semiconductor rectifier units arranged in different ways.

In the arrangement shown in FIG. 4, the controlled semiconductor rectifier unit 4 is connected after the full wave rectifier 3, in contrast to the arrangement of FIG. 2. Unit 4 has only one parallel controlled semi-conductor branch 13, and one diode to prevent discharge of smoothing condenser 7.

Figure 5:
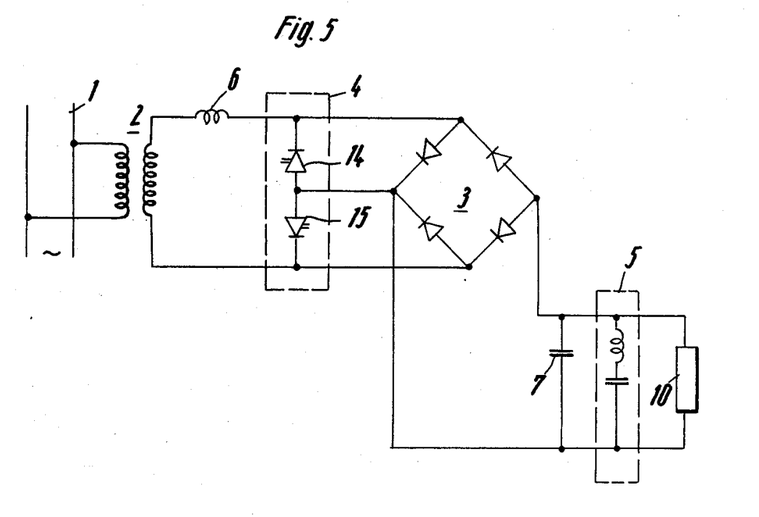

In the embodment shown in FIG. 5, the valve branches of the controlled semi-conductor rectifier unit 4 and of the full wave rectifier 3, which are supplied with equal currents, are combined. As can be seen, respective controllable and quenchable controlled semi-conductor rectifiers 14 and 15 are connected, in parallel with the diodes of the left bridge half of full wave rectifiers 3, the polarities of the controlled rectifiers 14 and 15 being opposed to the polarities of the respective associated diodes of the full wave rectifier 3.

Figure 6:
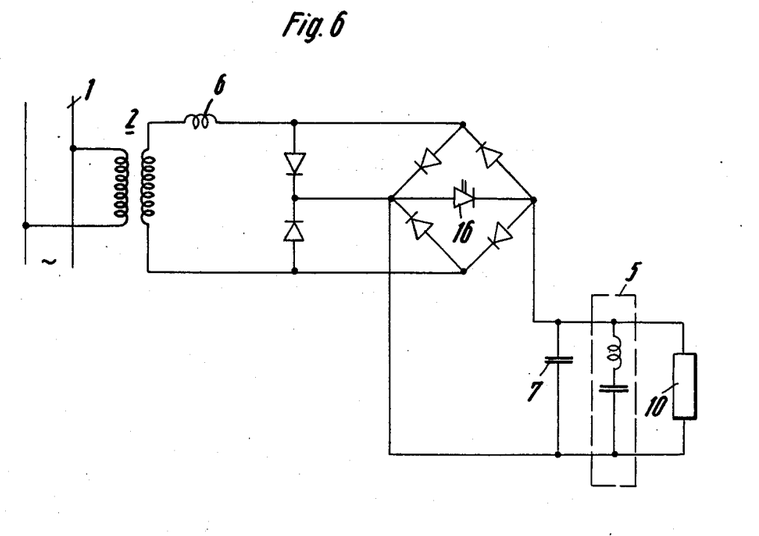

In the embodiment of the invention shown in FIG. 6, the controlled semi-conductor rectifier unit 4 and the full wave rectifier 3 are likewise combined, with respective diodes being arranged parallel to the diodes of the left bridge half and a controllable and quenchable controlled rectifier 16 being arranged, with the represented polarity, between the centers of the two bridge halves to interconnect these centers.

Figure 7:
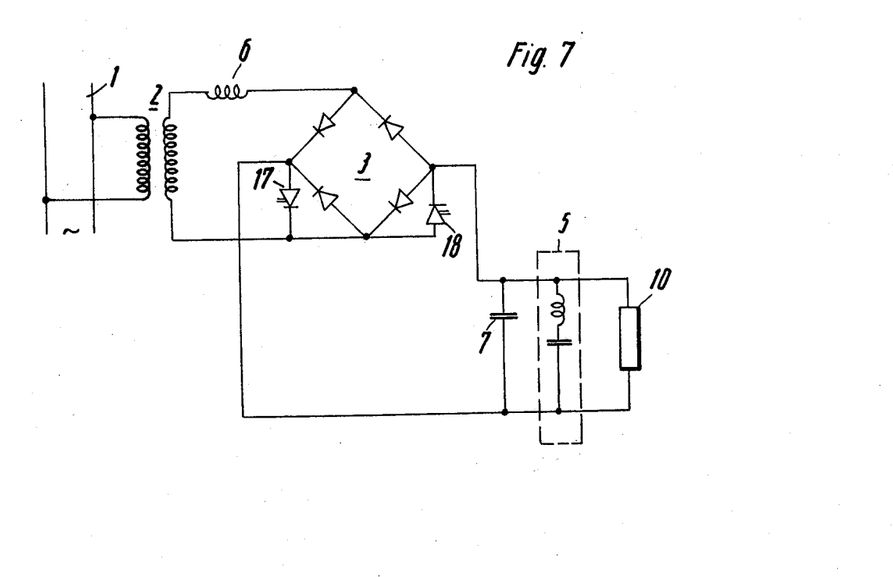

FIG. 7 represents an embodiment of the invention in which there is also a combination of the controlled semi-conductor rectifier unit 4 and the full wave rectifier 3, where controllable and quenchable controlled semi-conductor rectifiers 17 and 18, respectively, are connected in parallel to the diodes of the lower bridge halves of the full wave rectifier 3, each controlled rectifier 17 and 18 having its polarity reversed with respect to the associated rectifier or diode of the full wave rectifier 3.

Figure 8:
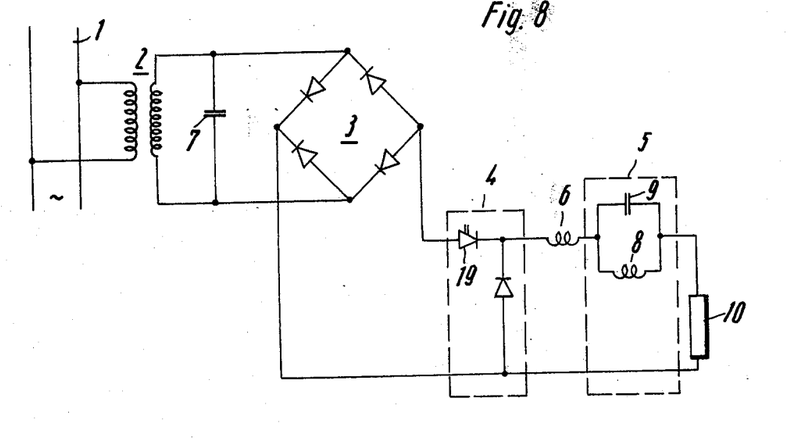

FIG. 8 illustrates a second embodiment for realizing the objective of the invention, in accordance with the curves of FIGS. 1d and 1e. The order of the individual groups, namely, the mains transformer 2, full wave rectifier 3, controlled semiconductor rectifier unit or arrangement 4, filter 5, and DC load 10, is the same as in the arrangement shown in FIG. 4. The smoothing devices likewise consist of a smoothing condenser 7 and a smoothing choke 6 but, in the embodiment shown in FIG. 8, smoothing choke 6 is arranged behind controlled semi-conductor rectifier unit 4 and smoothing condenser 7 is arranged in advance of full wave rectifier 3. That is, condenser 7 and choke 6 are interchanged relative to the arrangement shown in FIG. 4. Since the controlled semi-conductor rectifier unit 4 effects a modulation of the half waves of the mains voltage in correspondence with the time diagram of FIG. 1d, FIG. 8 illustrates a longitudinal valve branch provided with a controllable and quenchable rectifier 19, and a parallel branch provided with an uncontrolled rectifier.

Filter 5, which is tuned to double the mains frequency, is provided for filtering out the sinusoidal portion of the mean voltage value and, in the embodiment of FIG. 8, it consists of a parallel connection of a filter choke 8 and filter condenser 9 arranged, in series, in advance of DC load 10. Consequently, the mean DC voltage value $U_g$ and the direct current value $I_g$ are also supplied to DC load 10. Smoothing choke 6 of the smoothing devices serves, in the same manner as smoothing choke 6 of the arrangement of FIG. 4, to filter out the voltage pulses and to feed the current. Similarly, smoothing condenser 7 serves, in the arrangement shown in FIG. 8, to filter out the current pulses and to impress the voltage. The controlled semiconductor rectifier unit 4 of FIG. 8 is controlled in the same manner as the corresponding unit 4 of FIG. 4, by a corresponding pulse control method, with the current and voltage pulses, represented in FIGS. 1d and 1e appearing at the output of the controlled semiconductor rectifier unit 4. The smoothing devices of FIG. 8 serve also to filter out the mean values represented in broken lines in FIGS. 1d and 1e.

Figure 9:
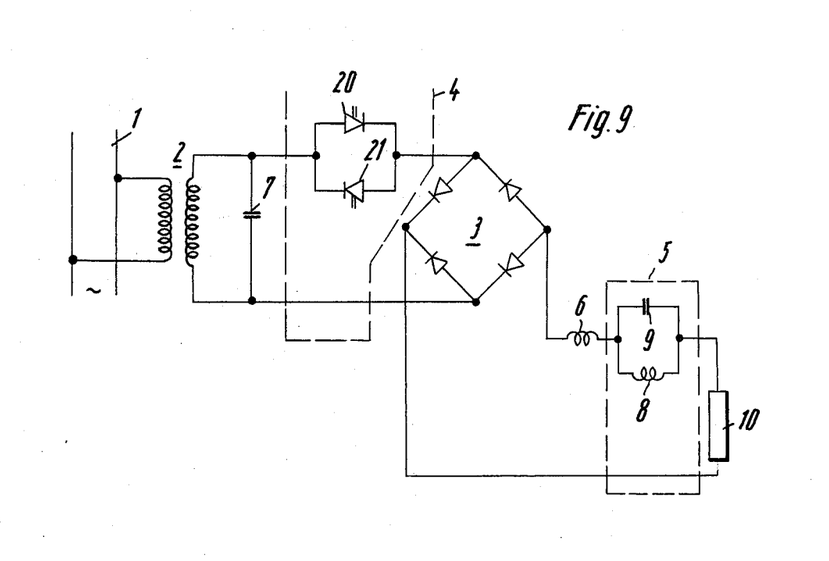
Figure 10:
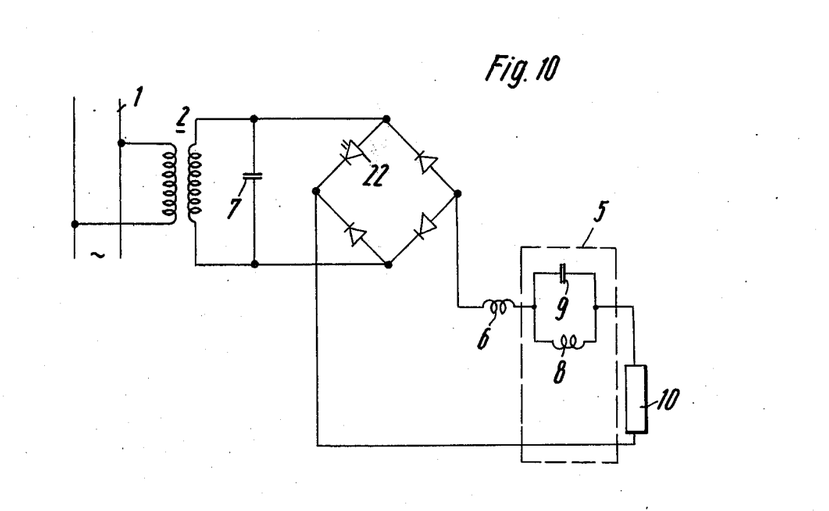
Figure 11:
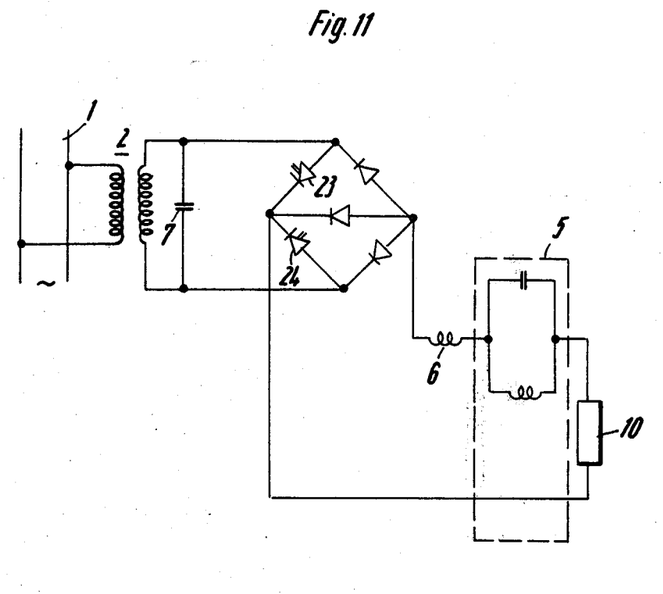

FIGS. 9, 10 and 11 illustrate additional embodiments of the invention, in which the parts identical with those in the arrangement of FIG. 8 are indicated by the same reference numbers.

In the embodiment of the invention shown in FIG. 9, the position of controlled semi-conductor rectifier unit 4 is changed, with respect to the embodiment shown in FIG. 8, in that it is arranged ahead of full wave rectifier 3. The unit 4 shown in FIG. 9 has, in the same manner as the semi-conductor controlled rectifier unit 4 of FIG. 8, a longitudinal branch provided with a controlled rectifier 20 and a controlled rectifier 21 is connected in parallel with controlled rectifier 20, but with a relatively reversed polarity.

In the embodiment shown in FIG. 10, controlled semi-conductor rectifier unit 4 is combined with full wave rectifier 3, such as shown in FIG. 9, in such a way that a controlled rectifier 22, instead of the usual diode, is arranged in the upper valve branch of the left bridge half of rectifier 3.

FIG. 11 illustrates an embodiment of the invention in which semi-conductor controlled rectifier unit 4 also is combined with full wave rectifier 3, otherwise the same as shown in FIG. 9. In the embodiment of FIG. 11, the usual diodes of the left bridge half of full wave rectifier 3 are replaced by respective controlled semi-conductor rectifiers 23 and 24, and an uncontrolled diode is connected between the two bridge centers with the indicated polarity.

A control device or arrangement for the controlled semi-conductor rectifier units or arrangements shown in FIGS. 4 through 11 is illustrated in FIG. 2. The voltage between the AC terminals of full wave rectifier 3 is in agreement in magnitude with the voltage on the DC load 10, if the quenchable thyristors 11 and 12 of unit or arrangement 4 are non-conducting or block current flow. When these thyristors are conductive, the voltage between the AC terminals of full wave rectifier 3 is zero. The load current flowing through smoothing choke 6 is conducted through one or the other of thyristors 11 or 12 in dependence on the instantaneous polarity.

The term "true active power" as used herein is the active power taking into account all of the harmonics. If too many harmonics are included in an oscillation, the active power or the effective value of this oscillation decreases, because the harmonics do not contribute to the active power.

In the quenched, non-conductive state of thyristors 11 and 12, the current flows through smoothing choke 6, full wave rectifier 3 and the DC load circuit. The difference between the generally sinusoidal mains voltage, as transformed by mains transformer 2, and the voltage between the AC terminals of full wave rectifier 3 is absorbed by smoothing choke 6. The desired, substantially sinusoidal course of the mains current is obtained by predetermining the ignition and quenching times of thyristors 11 and 12 by a two-point current regulator 25. The sinusoidal nominal voltage is determined by a nominal value former 28, where the nominal value is determined by a DC voltage regulator 29 and from the phase relation between AC voltage and load alternating current, through voltage transformer 27, taking into account the voltage drop across smoothing choke 6, which leads the load alternating current by 90°. By the term "nominal value former," as used herein, is meant a device which, in accordance with its intended function in a control system, forms or furnishes a desired (nominal, ideal, rated) value through a set value transmitter or setting means.

The actual value of the secondary current of mains transformer 2, which is practically identical with the mains current, is fed to two-point regulator 25 through current transformer 26. The DC voltage regulator 29 receives the actual value of its control quantity through DC voltage measuring device 31, and the nominal DC voltage value through DC voltage setting means 30. The DC voltage regulator 29 always adjusts the nominal blocking period voltage so that the power required in the DC load is supplied from AC voltage mains 1.

The substantially sinusoidal load alternating current, flowing through smoothing choke 6, is transformed by the arrangement consisting of thyristors 11 and 12 and full wave rectifier 3 into a rectified mixed current. The pulsating portion of the mixed current consists of two components, namely a sinusoidal alternating current at double the mains frequency and a current oscillating with the pulse frequency of controlled semi-conductor rectifier unit 4. The load alternating current, which is at twice the mains frequency, flows, almost exclusively, through filter 5 formed by condenser 8 and choke 9 designed as a filter circuit. The alternating voltage portion having twice the mains frequency flows through smoothing condenser 7.

Since the instantaneous values of the DC power can never become negative in the present case, that is, there can be no return feed, the voltage on the AC terminals of the arrangement can be reversed in polarity only after the passage through zero of the load alternating current flowing through smoothing choke 6. However, because the switching times of thyristors 11 and 12 are determined solely by two-point regulator 25 with the series-connected blocking period control device, it is not impossible that values of the AC voltage, other than zero, will appear immediately before or after the passage of the current through zero. The polarity of this AC voltage is always in agreement with the polarity of the load alternating current, that is, the phase angle $\phi$ between the load alternating current $i_w$ and the AC voltage $u_w$, as shown in FIG. 3b, can only assume the value zero in proper operation.

Consequently, no shift reactive, wattless, or idle power appears on the input of the arrangement. The idle power consumption of smoothing choke 6 therefore must be supplied completely from the AC mains. With a given mean beat frequency of the triangular auxiliary voltage, the approximation of the alternating current from the mains to the sinusoidal form becomes more successful with an increase in the inductance of smoothing choke 6. The consumption of shift idle power therefore cannot be reduced simply at random, in view of the distortion idle power, by reducing the inductance of smoothing choke 6. However, it is possible to compensate the idle power consumption of smoothing choke 6 by a series condenser.

Figure 3A:
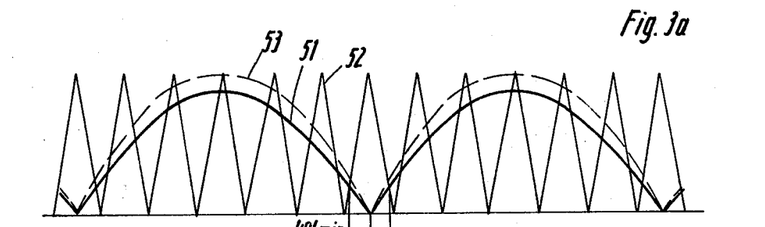
FIG. 3a is the voltage current pulse diagram of the sinusoidal nominal voltage, triangular auxiliary voltage and AC voltage from the mains with the arrangement shown in FIG. 2.
Figure 3B:
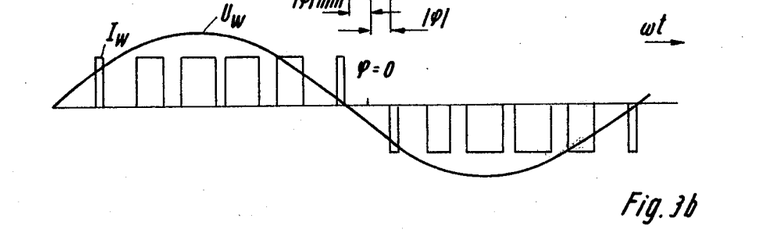
FIG. 3b graphically illustrates the load alternating current of the arrangement shown in FIG. 2.

The control of the pulse width in accordance with the invention is realized, in the embodiment shown in FIG. 2, by comparing a sinusoidal nominal voltage 51, such as shown in FIG. 3a, in alignment with a triangular auxiliary voltage 52. Whenever the auxiliary voltage 52 is higher than the rectified nominal voltage, thryistors 11 and 12 of the controlled semi-conductor rectifier unit or arrangement 4 must be made conductive and, in the opposite case, they must be made non-conductive. The curves of FIG. 3a illustrate the course of the nominal voltage 51, of the fundamental oscillation of the voltage after the rectification, and the curve of FIG. 3b shows the time slope of the AC voltage $u_w$ between the AC terminals of full wave rectifier 3 and of the load alternating current $i_w$ through smoothing choke 6. As can be seen, nothing is changed in the course of the AC voltage, as long as the load alternating current $i_w$ leads or lags the fundamental oscillation of the voltage by not more than $/\phi/_{adm}$. If the angle $\phi$ which has, in FIG. 3a, value about $-15°$, assumed an even higher negative value, the part of the voltage block after the zero passage of the load alternating current would flip down, that is, the voltage gradient would be substantially changed and would deviate from the desired course in that it would have many harmonics. The smallest admissible range for the phase angle $\phi$ results, as can be seen from FIG. 3a, with the greatest possible adjustable amplitude 53 of nominal voltage 51. In order to compensate the idle power of smoothing choke 6 as far as possible by means of the arrangement, it is necessary to effect the control of the controlled semi-conductor rectifier unit 4 so that the angle $/\phi/_{min}$ is as great as possible. This is attained only if the frequency $f_T$ of the triangular auxiliary voltage is synchronized so that it has exactly the same phase as the AC voltage from the mains.

The phase position must be displaced by ½ · $1/f_t$ relative to the state shown in FIG. 3a, so that the zero passages of the triangular auxiliary voltage and of the sinusoidal nominal voltage coincide. The value $/\phi/_{min}$ is thus about doubled, compared to the conditions in FIG. 3a. An increase of the value $/\phi/_{min}$ can be obtained if the frequency of the triangular auxiliary voltage is not selected to be constant but is so varied, within a half cycle of the sinusoidal nominal voltage 51, that the frequency in the proximity of the zero passages of this nominal voltage is lower than in the proximity of the peak values of the nominal voltage.

A further reduction of the harmonic content is attained if two or more arrangements, such as shown in FIG. 2, are combined into a single arrangement, where the mains transformer 2 can consist of several part transformers, with the part transformers being connected in series on the primary side, the DC side being connected in parallel, and the valves of the controlled semi-conductor rectifier unit of one arrangement being ignited and quenched in phase-shifted relation with respect to the valves of the semi-conductor controlled rectifier unit of the other arrangement, in the case where the transformer is divided into two part transformers. Such an arrangement is shown in FIG. 12.

Figure 12:
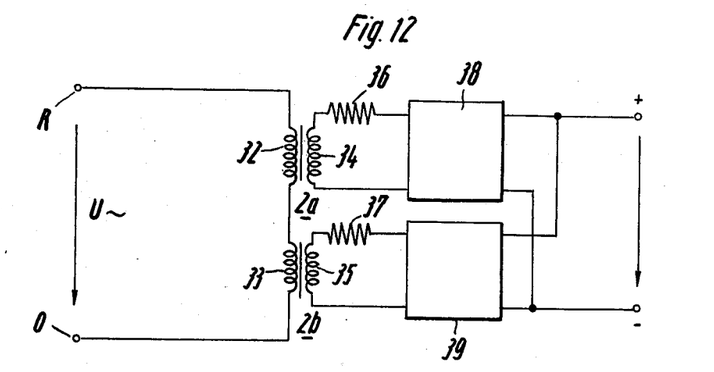
FIG. 12 is a schematic wiring diagram illustrating two arrangements, as shown in FIG. 2, combined into an overall arrangement.

Referring to FIG. 12, the mains voltage $u$, applied between the terminals R and O, is applied across the series-connected primary winding 32 and 33 of two part-transformers 2a and 2b, whose respective secondary windings 34 and 35 are connected, through respective smoothing chokes 36 and 37, to respective arrangements or units 38 and 39 corresponding fully to the arrangement or embodiment shown in FIG. 2. However, it is also possible to combine smoothing chokes 36 and 37 into a single choke, and to connect the combined chokes in series, on the primary side, with primary windings 32 and 33 of part transformers 2a and 2b, respectively.

Figure 13:
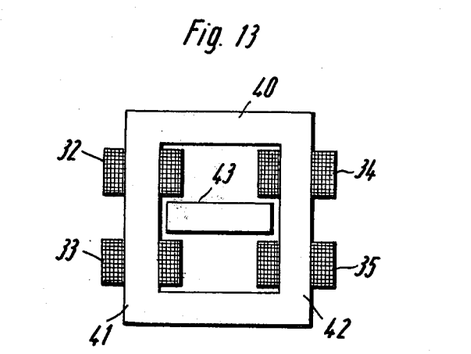
FIG. 13 is an elevation view, partly in section, of the magnetic frame common to the two part transformers shown in FIG. 12.

The waviness of the current in the primary windings 32 and 33 and the secondary windings 34 and 35 of the respective two part-transformers 2a and 2b, and thus of the entire arrangement, and hence also the effective value of the harmonics is reduced, which results in a considerable improvement of the overall power factor. The overall power factor is improved particularly by arranging primary windings 32 and 33 and secondary windings 34 and 35 on a common magnetic frame 40 as shown in FIG. 13. In frame 40, the two arms 41 and 42 are bridged by an equalizing yoke 43. This also reduces the total weight of the mains transformer consisting of two-part transformers 2a and 2b, as compared to two individual transformers connected in series.

Figure 14:
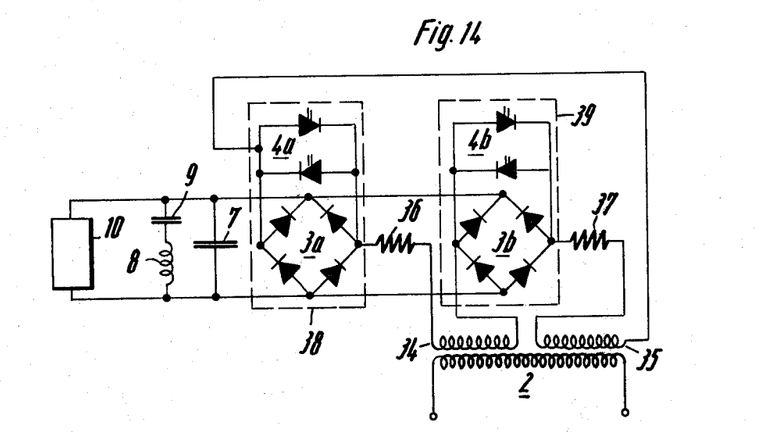
FIG. 14 is a schematic wiring diagram of the overall arrangement shown in FIG. 12.

FIG. 14 illustrates, in more detail, an arrangement according to FIG. 12 and which permits producing three different instantaneous values within a half oscillation of the AC voltage on the secondary side. Without increasing the beat frequency of the triangular auxiliary voltage, more than two instantaneous values zero and maximum of rectification are used for the formation of the voltage. As already indicated in FIG. 12, two identical arrangements 38 and 39 of the type shown in FIG. 2, are connected in parallel on their direct current sides, while the AC sides, including the respective chokes 36 and 37 as well as the respective secondary windings 34 and 35 of mains transformer 2, are connected in series.

When all the thyristor units 4a and 4b are blocked, each secondary winding 34 and 35 is connected through its respective choke 36 and 37 and the respective full wave rectifier 3a and 3b to the DC voltage side. That is, the instantaneous value of the DC load voltage is equal to the full DC voltage of the DC side, as seen from a secondary winding of mains transformer 2. When all the thyristor units 4a and 4b are conductive, the instantaneous value of the load voltage is zero, as seen from a secondary winding.

If the thyristor branches are blocked in one of the units 4a or 4b while they are conductive in the other unit, the full DC voltage appears, for the series connection of the two secondary windings 34 and 35 of mains transformer 2, as the instantaneous value of the DC load voltage. As related to a single secondary winding 34 or 35, the DC load voltage therefore has the value of half the DC voltage.

As indicated in the description of FIG. 2, the control of the controlled semi-conductor rectifier units 4 is effected by means of a sinusoidal nominal voltage and a triangular auxiliary voltage, which are compared in a two-point regulator 25. The two-point regulator 25 of FIG. 2 receives, as an input quantity, the difference between the auxiliary triangular voltage and the magnitude of the sinusoidal nominal voltage for the fundamental oscillation of the AC voltage, and which is formed in the nominal value former 28. The triangular auxiliary voltage is synchronized in proper phase relation to the nominal voltage. The two-point regulator 25 supplies the quenching and ignition signals for the quenchable thyristors 11 and 12 of the controlled semiconductor rectifier unit 4, through a post-connected blocking-period control device. The amplitude of the nominal voltage formed in the nominal value former 28 for the fundamental oscillation of the voltage is determined substantially by the AC voltage of the mains as measured by the voltage transformer 27, and the phase shift, relative to the mains voltage, is determined substantially by the DC voltage regulator 29. Suitable switching means contained in nominal value former 28 assure that, on the one hand, the phase angle between the load alternating current and the mains voltage has, as far as possible, the value zero, and, on the other hand, that the admissible value of the phase angle between the fundamental voltage oscillation on the controlled semi-conductor rectifier unit 4 and the load alternating current is not exceeded.

In a similar manner, a comparable control circuit is provided for the embodiment of the invention shown in FIG. 14, to keep the DC voltage constant in the DC load circuit, and the necessary nominal value formers 28 and two-point regulators 25 are also provided. With a given beat frequency of the triangular auxiliary voltage, the approximation of the load alternating current to the ideal sinusoidal form will be the more successful the higher is the inductance of smoothing choke 6. Since the idle power consumption of smoothing choke 6 increases in proportion to the inductance, a phase angle zero between the mains voltage and the load alternating current can be maintained only up to a certain magnitude of the inductance of the smoothing choke 6.

Figure 15A:
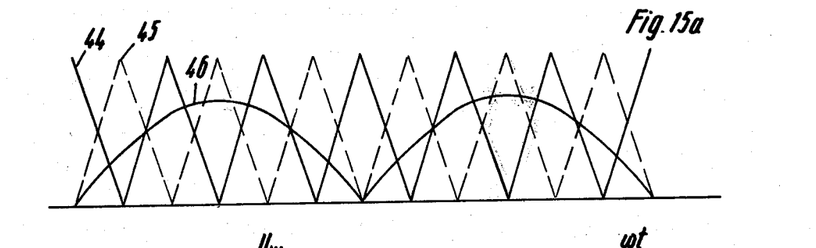
FIGS. 15a and 15b illustrate, respectively, the voltage and current pulse diagrams for the arrangement shown in FIG. 14, with two triangular auxiliary voltages.

FIG. 15 graphically illustrates how the ignition and quenching times of the thyristor branches or units 4a and 4b can be determined by means of two triangular auxiliary voltages 44 and 45, by comparison with the magnitude of the nominal voltage 46 of the fundamental oscillation. If the number of switchings per second of the entire arrangement 38 and 39 is not to be not greater than in the simple arrangement shown in FIG. 2, the frequency of the two triangular auxiliary voltages must be selected to be half as high, in the entire arrangement 38 and 39 of the embodiment of FIG. 14, as in the simple embodiment shown in FIG. 2. The two triangular auxiliary voltages must be phase-shifted relative to each other by 180°.

Figure 15B:
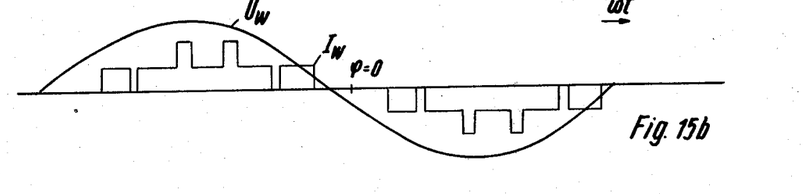

FIG. 15b shows the time slope of the DC load voltage, as seen from a secondary winding 34 or 35 of mains transformer 2. The selection of the thyristor branches to be ignited is effected preferably in such an order that the current load of all the thyristors is the same on the average.

Figure 16:
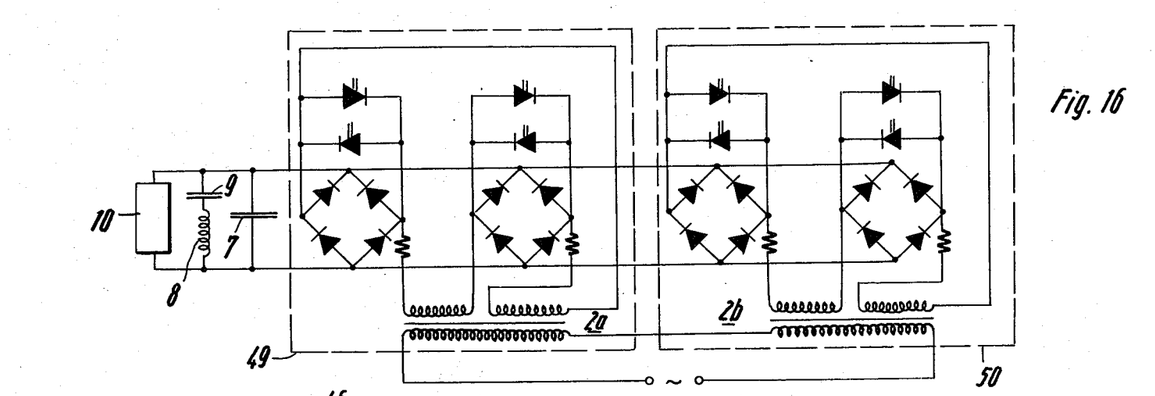
FIG. 16 is a schematic wiring diagram illustrating two arrangements, such as shown in FIG. 14, or four arrangements, such as shown in FIG. 2, connected in series on the AC side and in parallel on the DC side.

In high power plants, it does not mean an additional expense if the total power is distributed over more than two arrangements of the type shown in FIG. 2. FIG. 16 illustrates an embodiment which permits realizing, with only a single direct current load circuit, five amplitude stages for the DC load voltage as seen from the AC voltage mains. The embodiment of the invention shown in FIG. 16 consists of two arrangements as shown in FIG. 14, or of four arrangements as shown in FIG. 2, which are connected in parallel on the DC side and where the primary windings of the mains transformers are connected in series.

Figures 17A, 17B:
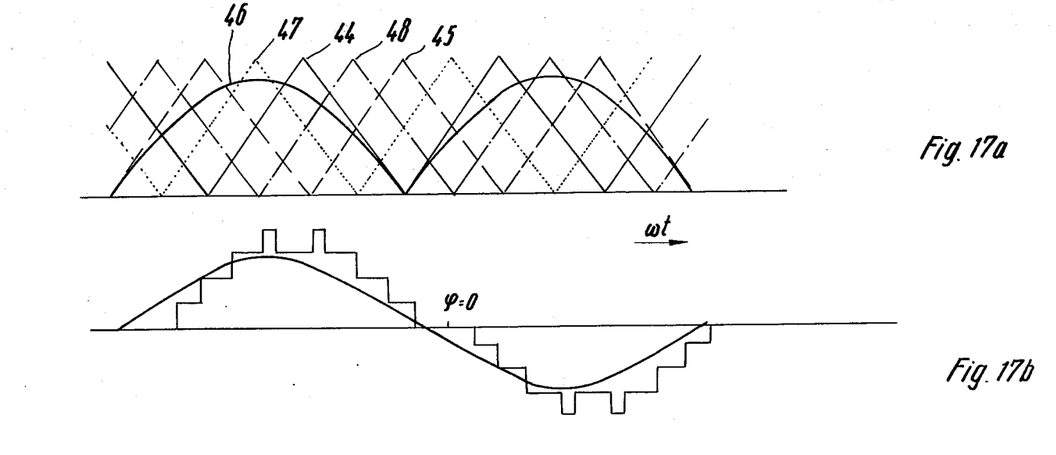
FIGS. 17a and 17b illustrate, respectively, the voltage and current pulse diagrams for the arrangement shown in FIG. 16, with four triangular auxiliary voltages.

FIG. 17a graphically illustrates how the ignition and quenching times of the thyristors can be determined by means of four triangular auxiliary voltages 44, 45, 47 and 48, by comparison with the magnitude of the nominal voltage of the fundamental oscillation 46 of the resulting load alternating voltage. If the cycle of the four triangular auxiliary voltages, in the arrangement shown in FIG. 16, is as large as the cycle of the triangular auxiliary voltages of the simple arrangement shown in FIG. 2, the number of switchings per second in the arrangement of FIG. 16 is not greater than in the arrangement shown in FIG. 2.

FIG. 17b graphically illustrates the time slope of the resulting DC load voltage as seen from the AC voltage mains, and which is obtained if the phase displacements between the four triangular auxiliary voltages are 90°. The selection of the order of the ignition of the various thyristor branches preferably is effected so that the current load can be the same, on the average. However, it may also be advantageous not to control the arrangement according to FIG. 16 with an integral frequency ratio, which means less expense with the same efficiency of harmonic suppression.

The concept of the invention is not limited to the arrangements and circuits shown by way of example. In particular, various, also non-integral, multiples of the mains frequency can be selected for the frequency of the triangular auxiliary voltages, and even quite different control methods may be used. For the controlled semi-conductor rectifier units there can be used all variants known in converter engineering.

While specific embodiments of the invention have been shown and described in detail to illustrate the application of the principles of the invention, it will be understood that the invention may be embodied otherwise without departing from such principles.

What is claimed is:

1. In an arrangement for feeding a DC load circuit from single phase or polyphase AC voltage mains, with economizing of idle, or reactive or wattless, power consumption of load alternating current, including a mains transformer having a primary winding connected to the AC voltage mains and a secondary winding connected to a load circuit in turn connected to a DC load, with said load circuit having connected therein a full wave rectifier, smoothing devices, and at least one positively quenchable controlled semi-conductor rectifier with a respective control device connected thereto: the improvement comprising, in combination, said smoothing devices including at least one condenser connected across said load circuit, at least one choke connected in series in said load circuit, and at least one filter connected in said load circuit between said rectifier and said DC load, said filter being tuned to double the frequency of said AC voltage mains; positively quenchable controlled semiconductor rectifier means controlling the magnitude of one current, of the alternating current and direct current, available on the secondary side of said mains transformer in the form of current or voltage; and a control device connected to and controlling said controlled rectifier means by pulse width modulation thereof, to maintain the time slope of the power in the load circuit substantially in phase with the slope of the power, fluctuating with twice the mains frequency about the constant-per-unit-of-time mean load power, of the load alternating current which is in phase with the mains AC voltage.

2. In an arrangement for feeding a DC load circuit, the improvement claimed in claim 1, in which said semi-conductor controlled rectifier means comprises at least one controlled semi-conductor rectifier forming part of a controlled semi-conductor rectifier unit operable to initiate and cut-off the alternating or direct current, in the load circuit connected to the secondary winding of said mains transformer, at predetermined time intervals.

3. In an arrangement for feeding a DC load circuit, the improvement claimed in claim 1, in which said controlled rectifier means comprises at least one controlled semi-conductor rectifier forming part of at least one semi-conductor controlled rectifier unit operable to short-circuit the AC or DC voltage, in the load circuit connected to the secondary side of said mains transformer, at predetermined intervals.

4. In an arrangement for feeding a DC load circuit, the improvement claimed in claim 1, in which said semi-conductor controlled rectifier means comprises at least one controlled semi-conductor rectifier included in at least one controlled semi-conductor rectifier unit; said control device controlling each controlled rectifier unit in a manner such that voltage or current pulses of each half wave appearing on said full wave rectifier, and originating from the AC voltage mains, are substantially symmetrical to each other and such that all the controlled rectifier units are conductive at the times the AC oscillation passes through zero.

5. In an arrangement for feeding a DC load circuit, the improvement claimed in claim 4, in which said control device comprises a two-point regulator having a blocking period operating mechanism connected in series therewith; said control device comparing at least one triangular auxiliary voltage with a mains-related nominal voltage formed from unipolar sinusoidal half waves, to provide ignition and quenching signals for said controlled semi-conductor rectifiers; said control device providing ignition and quenching signals for said controlled semi-conductor rectifiers when there is zero difference between the sinusoidal nominal voltage and the triangular auxiliary voltage; and a nominal value former operable to adjust pre-calculated values of the ratio between the mains frequency and the frequency of the auxiliary voltage.

6. In an arrangement for feeding a DC load circuit, the improvement claimed in claim 5, including plural arrangements as claimed in claim 5, each including a respective controlled semi-conductor rectifier unit, combined to form a total arrangement; said mains transformer comprising plural part-transformers having respective secondary windings connected to each arrangement included in the total arrangement; said part-transformers being connected in series on their primary winding sides; the controlled rectifiers of the respective controlled rectifier units of each of said arrangements being ignited and quenched in phase-shifted relation with respect to the controlled rectifiers of the controlled rectifier units of each other arrangement.

7. In an arrangement for feeding a DC load circuit, the improvement claimed in claim 5, in which said nominal value former maintains a ratio, between the mains frequency and the auxiliary voltage frequency, which is an integral number.

8. In an arrangement for feeding a DC load circuit, the improvement claimed in claim 5, in which said control device is operable to vary the phase relation of the AC voltage on at least one controlled semi-conductor rectifier relative to the alternating current by uniform variation of the ignition times for all the controlled semi-conductor rectifiers relative to the mains voltage.

9. In an arrangement for feeding a DC load circuit, the improvement claimed in claim 5, in which said control device is operable to vary the ratio of the value of the DC voltage to the amplitude of the AC voltage in a manner such that the angular difference between successive control signals, effecting quenching or ignition of controlled semi-conductor rectifiers of a controlled semi-conductor rectifier unit, is varied so that the mean value of the phase angles of both, relative to the mains voltage, does not change so that one ignition signal is advanced by the same amount as the other ignition signal is delayed.

10. In an arrangement for feeding a DC load circuit, the improvement claimed in claim 5, in which said control device selects the angular distances between the ignition and quenching signals for the controlled semi-conductor rectifiers, during the course of a quarter cycle of an AC oscillation, such that the ratio of the DC voltage to the amplitude of the fundamental AC voltage oscillation in the load circuit assumes a predetermined value at which the harmonic content of the load alternating voltage simultaneously attains a minimum.

11. In an arrangement for feeding a DC load circuit, the improvement claimed in claim 10, in which said control device effects such selection in a manner such that the ratio of the load DC voltage to the amplitude of the fundamental AC oscillation in the load circuit assumes a predetermined value such that a number of harmonics, having the lowest odd ordinal number, are reduced to zero, the number of such harmonics being equal to the number of ignition signals per quarter cycle less 1.

12. In an arrangement for feeding a DC load circuit, the improvement claimed in claim 10, in which said control device effects such selection in a manner such that the peak values of the harmonic currents superposed on the fundamental oscillation of the mains current are all equal.

13. In an arrangement for feeding a DC load circuit, the improvement claimed in claim 10, in which said control device selects the angular distances between the ignition and quenching signals such that the zero passage of the fundamental oscillation of the AC voltage, in the load circuit, has an optimum duration during an interval in which all controlled semi-conductor rectifier units are ignited.

14. In an arrangement for feeding a DC load circuit, the improvement claimed in claim 6, in which each controlled semi-conductor rectifier unit consists of two identical thyristors connected in parallel with each other with relatively opposite polarities; a respective full wave rectifier for each arrangement included in the total arrangement; each full wave rectifier having its AC side connected to a respective secondary winding of said mains transformer; each arrangement of the total arrangement including a respective smoothing choke; the arrangements forming the total arrangements being connected in parallel on the DC load circuit side and in series on the alternating current side.

15. In an arrangement for feeding a DC load circuit, the improvement claimed in claim 14, in which all the smoothing chokes are connected in series with the series-connected primary windings of said part transformers.

16. In an arrangement for feeding a DC load circuit, the improvement claimed in claim 14, in which each choke is associated with its respective arrangement in the secondary circuit, and is connected in series with the associated secondary winding of the part transformer.

17. In an arrangement for feeding a DC load circuit, the improvement claimed in claim 6, in which said total arrangement includes two identical arrangements; said mains transformer including a common magnetic frame having two arms on which the two part-transformers are arranged; and an equalizing yoke, for the differential magnetic flux of the two part transformers, being positioned between said two arms of said common magnetic frame.

18. In an arrangement for feeding a DC load circuit, the improvement claimed in claim 6, in which four said arrangements are combined to form one total arrangement each including a respective secondary winding of said mains transformer; said arrangements constituting said total arrangement being connected in parallel on the DC side and said mains transformer including respective primary windings connected in series with each other.

19. In an arrangement for feeding a DC load circuit, the improvement claimed in claim 5, in which said control device effects ignition and quenching of the controlled semi-conductor rectifiers of the respective controlled semi-conductor rectifier units in an order such that the current loads of all current carrying controlled rectifiers, during a half cycle, are about equal on the average.

20. In an arrangement for feeding a DC load circuit, the improvement claimed in claim 5, in which said control device effects ignition and quenching of the controlled semi-conductor rectifiers of the individual controlled semi-conductor rectifier units in an order such that the difference between the time integrals of the voltage of the magnetically independent mains transformer remains at a minimum.

21. In an arrangement for feeding a DC load circuit, the improvement claimed in claim 18, in which said control device provides a number of triangular auxiliary voltages corresponding to the number of controlled semi-conductor rectifier units each consisting of two thyristors connected in parallel with each other and with polarities reversed with respect to each other and a respective full wave rectifier; said triangular auxiliary voltages being phase-shifted uniformly relative to each other.

22. In an arrangement for feeding a DC load circuit, the improvement claimed in claim 21, in which the ratio between the auxiliary voltage frequency and the mains frequency, multiplied by the number of provided triangular auxiliary voltages, is an integral number.

23. In an arrangement for feeding a DC load circuit, the improvement claimed in claim 21, in which said control device is operable to vary the frequency of at least one triangular auxiliary voltage within the course of a half cycle of the sinusoidal nominal voltage.

24. In an arrangement for feeding a DC load circuit, the improvement claimed in claim 1, in which said filter is connected in parallel with the DC load and is designed as an LC-series oscillatory circuit; said controlled semi-conductor rectifier unit being connected in parallel with the DC load.

25. In an arrangement for feeding a DC load circuit, the improvement claimed in claim 1, in which said controlled semi-conductor rectifier unit is connected in series with the DC load; said filter being designed as an LC-parallel oscillatory circuit.

26. In an arrangement for feeding a DC load circuit, the improvement claimed in claim 1, in which the controlled semi-conductor rectifier units and the full wave rectifiers include common controlled semi-conductor rectifiers.

* * * * *